Oct. 14, 1952 — J. A. SAFFIR — 2,613,439
ARTIFICIAL TEETH
Filed Aug. 6, 1948 — 2 SHEETS—SHEET 1
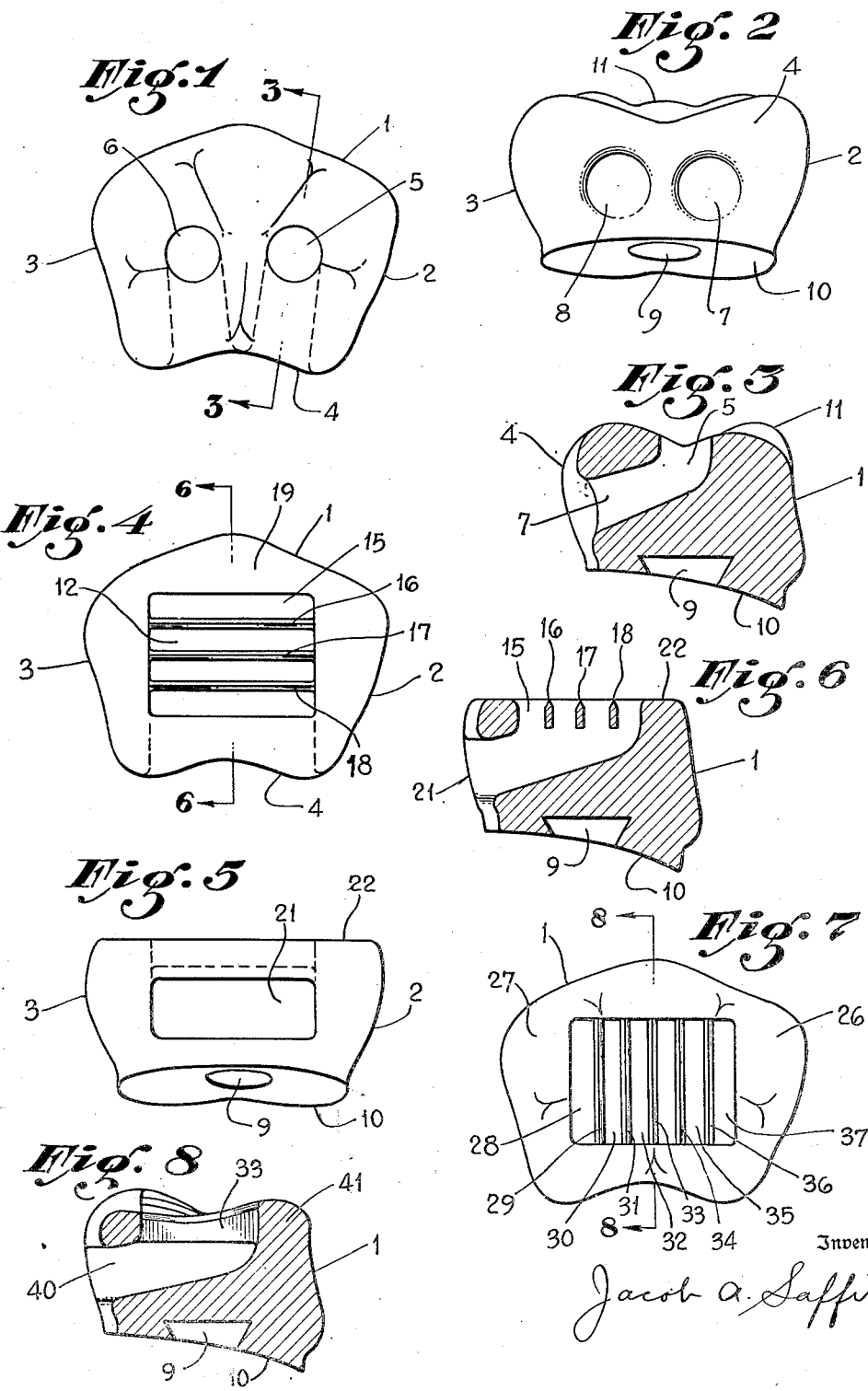
Inventor:
Jacob A. Saffir

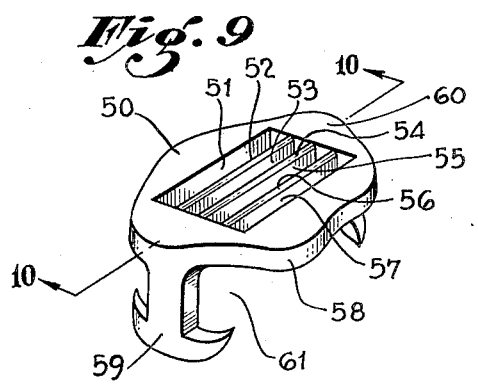
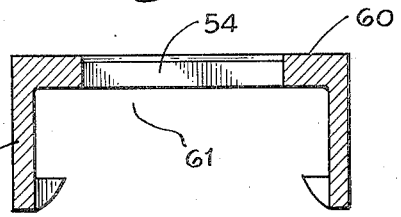
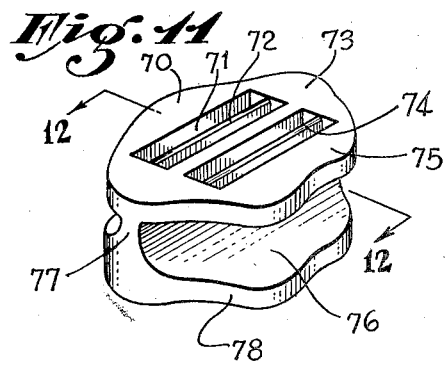
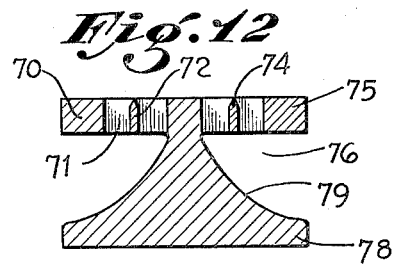
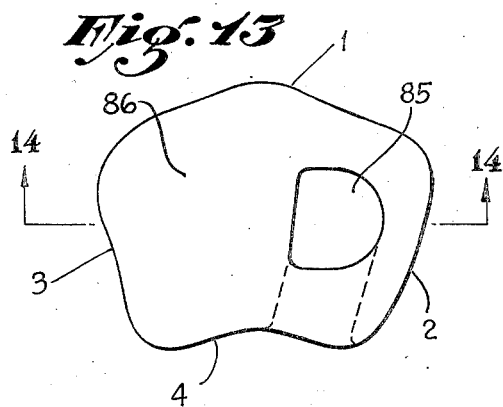
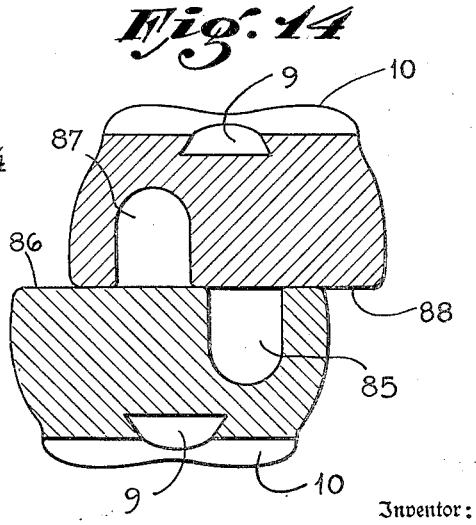

Patented Oct. 14, 1952

2,613,439

UNITED STATES PATENT OFFICE 2,613,439

ARTIFICIAL TEETH

Jacob A. Saffir, Los Angeles, Calif.

Application August 6, 1948, Serial No. 42,949

17 Claims. (Cl. 32—8)

This invention relates to improvements in masticatory devices, such as artificial teeth, especially those intended for the replacement of the natural teeth known as bicuspids and molars. The reference to artificial teeth herein is intended to embrace within its scope any device adapted for use in the oral cavity for the purpose of masticating or comminuting food, or for replacing any natural tooth, and may be of any design or configuration.

Tooth form and structure in artificial teeth have always more or less copied natural teeth, particularly as regards the method of comminuting food, which is primarily by crushing.

Natural teeth, however, are embedded in bone and gums and by virtue of this strong support are capable of exerting tremendous pressures. While pressures of 25 lbs. to 90 lbs. are extremely common, pressures up to 275 lbs. have been found in normal healthy mouths.

Artificial teeth having no anchorage in bone, can exert a pressure of only ten to 15 pounds and under the most ideal conditions a possible maximum of forty pounds.

One of the objects of this invention is to provide a chewing means using a new method of comminuting food particles, such method being far more efficient with the light pressures generally prevailing in edentulous mouths.

Another object is to provide a tooth wherein the back pressure incident to crushing between two surfaces is greatly reduced.

Another object of this invention is to provide a tooth that can cut food as well as crush it.

Still another object is the provision of teeth whose occluding surfaces can grasp and hold food with less chance for slipping or moving off of the table of occlusion than is provided by present teeth.

The attainment of the above and further objects of this invention will be apparent from the following specification taken in conjunction with the accompanying drawings forming a part thereof.

Figure 1 is a plan view of the occluding surface of a lower molar.

Figure 2 is a view of the lingual surface of that same molar.

Figure 3 is a sectional view of the same molar taken at the line 3—3 in Figure 1.

Figure 4 is a plan view of the occluding surface of a typical molar showing another modification of the invention.

Figure 5 is a view of the lingual surface of the tooth shown in Figure 4.

Figure 6 is a sectional view of the same molar taken on line 6—6 of Figure 4.

Figure 7 is a plan view of the occluding surface of a posterior tooth showing another modification.

Figure 8 is a sectional view of the tooth illustrated in Figure 7 taken at the lines 8—8 in that figure.

Figure 9 is a perspective view of a tooth embodying another modification of the invention.

Figure 10 is a sectional view of the same tooth taken along the lines 10—10 of Figure 9.

Figure 11 is a perspective view of a tooth embodying still another modification of the invention.

Figure 12 is a sectional view of that tooth taken along the lines 12—12 in Figure 11.

Figure 13 is a plan view of the occluding surface of a molar embodying still another modification of the invention.

Figure 14 is a sectional view of a maxillary and mandibular molar such as is illustrated in Figure 13, depicting a triturating and chewing association when the teeth are in occlusion.

Like reference numerals refer to like parts throughout the several views.

Reference may now be had more particularly to Figure 1. This is the chewing surface of an anatomical molar. At 1 is the buccal surface; at 2 the mesial surface; at 3 the distal surface and at 4 the lingual surface. At 5 and 6 are two openings, the edges of which are quite sharp. These openings lead through canals in the tooth which open on the lingual surface.

A bolus of food crushed between the two surfaces such as these would have a tendency to undergo two distinct actions. First, as pressure was being applied, the food over the openings would be inclined to enter them and thus be reduced to the size of the canals. Second, there would be some crushing in other areas of the tooth. As chewing progresses, more and more food would be reduced in size as the result of being forced through the canals.

The ability of the food to enter the canals not only causes the food to be broken up but also reduces greatly the back pressure resulting from the compression of food between two surfaces where the escape from the center is quite distant.

In Figure 2 the openings 7 and 8 are on the lingual surface, and may, if desired, be of somewhat larger diameter than the inlet openings 5 and 6, as shown in Figs. 1 and 3, thereby facilitating the flow of food particles through the canal or sluiceway. The numeral 11 designates the occlusal surface; 10 is the gingival surface; 9 is the retention means for anchoring on to a prosthetic appliance.

The two openings shown here are merely illustrative and it can be seen that it would be simple to make one large sluiceway on this surface or have several small ones. Similarly, on the occlusal surface, the number of openings can be varied.

These openings will require careful cleaning by the patient after eating. At present the dentist instructs denture wearers to clean dentures after every meal and before retiring. Since the patient is not always aware of the food particles which adhere to a prosthetic appliance, he may be lax in cleaning the denture sufficiently. This causes it to become foul and the patient is said to have "denture breath."

When the teeth described herein are used, it will be very obvious to the wearer that some of the areas may not be self cleansing and this will be more apt to induce the patient to cleanse his dentures frequently with special brushes and cleaning agents.

Figure 3 is a cross section at the point 3—3 in Figure 1. The canal 5 leads through the body of the tooth to the opening 7 on the lingual surface.

Figure 4 is the occlusal surface of another embodiment of the invention. The occluding surface 19 is flat and the large opening 15 is crossed by a series of knife-like members 16, 17, and 18, which are separated by spaces such as 12, between the blades 16 and 17. When these teeth occlude, the food is forced into and through these spaces and is sheared and cut by the blades.

These blades can be made of any suitable material but metals are preferred. Stainless steel, austenitic metals and the various chromium cobalt alloys suit the purpose. However, any other hard material that can be formed with a sharp edge that it will retain for some time can be used, such as hard porcelains, hard plastics, etc.

In Figure 5, 21 is the opening of the sluiceway on the lingual surface for the discharge of comminuted food. At 22 is a portion of the flat occlusal surface. While this tooth illustrates the sluiceway emptying on the lingual surface, which appears to be the most suitable for this purpose, the sluiceway can open on the lingual or buccal or both and as will be show, also on any surfaces desired.

Figure 6 is a sectional view of this tooth made on lines 6—6 in Figure 4. The blades 16, 17, and 18 come to a sharp cutting edge. In some mouths where the patient may have a tendency to keep his tongue on the tooth, because of nervousness, perhaps, these blares can be dulled slightly so that the tongue will not be cut or scratched.

It is possible, whenever necessary, to sharpen these blades by using a fine disk or stone. The whole tooth may be made of metal, in which case, the blades can be cast with the tooth, making the entire tooth a single casting. Or—if these blades are made from a material differing from the body of the tooth, they can be set into the body material by suitable retaining means. Or—the blades can be made replaceable, if desired, when excessively worn or accidentally broken.

The number of blades in a tooth may vary. The size of the tooth and the amount of chewing it will be expected to receive can determine this.

It has been found when using teeth of this type that one of the annoying objections incidental, in many cases, to artificial teeth has been overcome and that is the slipping of food from off the occlusal surface before the teeth get a chance to close on it.

Some users of artificial teeth require long periods of practice training before being able to keep food on the occlusal surface long enough to be chewed. This fault is obviated by these teeth as the edges of the canals and knives hold food stationary.

Figure 7 is the occluding surface of the posterior teeth using knife-like members as in Figure 4 but here the tooth is anatomical and the blades 29, 31, 33, 34, and 36 are shaped to follow the anatomy of the tooth, rising in cusp areas and following the sulci of the occluding surface.

In Figure 8 the blade 33 follows the slope of the cusp 41, downward into one of the pits of the teeth. Fig. 8 is a cross section of Fig. 7 taken on line 8—8.

In Figure 7, 26 is the mesio-buccal cusp, 27 the distal buccal cusp, 28, 30, 32, 35, 37 are spaces for the food to pass through after being engaged by the knives. The food leaves the tooth at the opening 40, in Figure 8. The knife 33 has its upper cutting surface contoured anatomically so as to follow the anatomy of the cusp and the central pit.

In Figure 9 an occlusal table 60 is supported by a leg-like structure or member 59 which also has engaging means at its lower end for anchoring it in a prosthetic appliance.

With this type of chewing means the dentist can set the teeth as high or low in the denture base as he desires and leave the entire area between the occlusal surface and denture base free for the escape of comminuted food.

The occlusal surface has an opening which is crossed by a number of blades 52, 54, 56 with spaces 51, 53, 55, 57. This structure can be made quite thin by using a strong metal.

The Figure 10 is a cross section of the tooth in Figure 9 taken from the points 10—10. At 61 is the open sluiceway beneath the chewing surface. If the blades in this tooth are to be replaceable, they can be set into special clips or locked in position by a fine screw or held by a low fusing solder, or, they can be placed into the tooth structure from the bottom or gingival portion of the tooth and be locked in from that surface.

Figure 11 is a chewing means in which there is a central supporting member 77 which divides the tooth mesio-distally at some point near its center so that the masticated food will find its way partly to the lingual surface 76 and partly to the buccal surface. At 70 is the occlusal portion, 73 the mesial portion, 75 the lingual portion of the occlusal surface. The blades 72 and 74 are set with spaces on each side, such as 71, through which food can pass after it has been cut and forced through the openings.

Figure 12 is a cross section of the Figure 11 taken from the points 12—12. The base of the tooth 78 is attachable to a prosthetic appliance. 70 is the buccal portion, 75 the lingual portion of the occlusal. The sluiceway 76 on the lingual directs food into the mouth. The wall 79 is curved and smooth so as not to resist the passage of food back into the mouth.

Figure 13 is an occlusal view of a flat surfaced tooth in which the portion 86 of the tooth is flat and the portion 85 has a canal and cutting means.

Figure 14 has two of these teeth in chewing relationship, the teeth having been sectioned mesio-distally as indicated by the line 14—14 in Figure 13. The flat surface 86 of the lower tooth is directly below the canal opening 87 in the upper tooth and the canal opening 85 in the lower tooth directly opposes the flat surface 88 of the upper tooth. With this arrangement which is applicable wherever desired, considerable pressure can be inserted to force food in through the canal openings.

It is also possible to place the cutting means in a criss cross position on the teeth so as to increase the cutting action.

Moreover it will be understood that the term "fenestration" or its equivalent, as utilized herein with respect to the occlusal or masticatory surface of an artificial tooth or the like, is intended to comprise any opening adapted to permit the passage of food therethrough from the said surface, for discharging the said food at any predetermined point along or outside of the structure of the artificial tooth or masticatory device and below the fenestration or opening of the occlusal or masticatory surface. It is, of course, possible to have these fenestrations in various positions and shapes. It is also possible to alter the design of the knives and cutting edges and the shape and size of the cutting tables and sluiceways without departing from the spirit of this invention.

What I claim as new, and desire to secure by Letters Patent is:

1. An artificial tooth comprising a masticatory surface provided with at least one opening therein, at least one cutting blade associated with said opening in the plane of said masticatory surface, and a passage extending from said opening below said masticatory surface adapted for the discharge of food below the said masticatory surface.

2. An artificial tooth comprising an occlusal surface provided with at least one inlet opening, a canal adapted for the passage of food therethrough extending from said inlet opening through the body of the tooth to an outlet opening on the lateral wall surface of said tooth, and at least one cutting edge comprising a knife-like blade member associated with said inlet opening in the plane of the occlusal surface.

3. An artificial tooth as in claim 2, wherein the cutting edge comprises knife-like blade members extending across the inlet opening and thereby subdividing the same.

4. An artificial tooth as in claim 2, wherein the cutting edge comprises knife-like blade members extending across the inlet opening thereby subdividing the same, and wherein the outlet opening of the canal is on the lingual surface of the tooth.

5. An artificial tooth comprising an anatomical occlusal surface having milling areas and provided with at least one inlet opening, a canal adapted for the passage of food therethrough extending from said inlet opening through the body of the tooth to an outlet opening on the peripheral wall surface of said tooth, and knife-like blade members associated with said inlet opening in the plane of the occlusal surface and corresponding with the anatomical contour of the occlusal surface at the said inlet opening.

6. An artificial tooth comprising a masticatory surface provided with a fenestration adapted for the passage of food therethrough to a point below the same, cutting blade members extending across said fenestration and thereby subdividing the same into a plurality of spaces, the cutting edge of said blade members being in the plane of the said masticatory surface, and leg-like members supporting said masticatory surface and adapted for anchoring the artificial tooth in a prosthetic appliance.

7. An artificial tooth comprising a masticatory surface provided with two fenestrations adapted for the passage of food therethrough to a point below the same, cutting blade members extending across said fenestrations and thereby subdividing the same, the cutting edge of said blade members being in the plane of the said masticatory surface, a supporting member attached to the under side of the masticatory surface and extending mesio-distally of the tooth substantially along the longitudinal axis thereof, said supporting member being positioned between the said two fenestrations and curving to a base portion, with one surface of the supporting member extending lingually and the other surface extending in the buccal direction, said curved portions being substantially smooth and adapted as sluiceways for directing food from said fenestrations to both the lingual and buccal sides of the mouth.

8. An artificial tooth comprising a masticatory surface provided with a fenestration adapted for the passage of food therethrough to a point below the same, cutting blade members extending across said fenestration and thereby subdividing the same into a plurality of spaces.

9. An artificial tooth as in claim 8, wherein the masticatory surface comprises a flat plane.

10. An artificial tooth as in claim 8, wherein the cutting blade members are replaceable.

11. An artificial tooth as in claim 1, wherein each cutting blade is replaceable.

12. An artificial tooth comprising a masticatory surface body portion provided with a plurality of fenestrations extending along a transverse dimension of the said surface and completely through said surface body portion, said masticatory surface body portion comprising the entire body of the tooth, and supporting leg-like members extending from the undersurface of said masticatory body portion, said leg-like members being adapted for anchoring the artificial tooth in a prosthetic appliance, whereby masticated food may pass directly through the masticatory surface body portion into the oral cavity.

13. An artificial tooth comprising a grate-like occlusal surface table, said table comprising the entire body of the tooth, and supporting leg-like members extending from the undersurface of the table, said leg-like members being adapted for anchoring the artificial tooth in a prosthetic appliance, whereby masticated food is adapted to pass directly through the occlusal surface table into the oral cavity.

14. An artificial tooth comprising a masticatory surface body portion provided with a plurality of fenestrations extending along a transverse dimension of the said surface and completely through said surface body portion, said masticatory surface body portion comprising the entire body of the tooth, and a supporting member attached to the underside of the masticatory surface body portion and extending substantially along a central axis thereof, said supporting member extending downwardly to a lower base portion adapted for attachment to a prosthetic appliance.

15. Complementary artificial teeth adapted to function in confronting relationship, each comprising a masticatory surface body portion provided with at least one opening therein adapted for the passage of food through the body of the tooth to a point below the masticatory surface and outside the tooth structure, said surface having solid areas for the grinding mastication of food, and cutting means coordinated with said opening in the plane of said masticatory surface, an opening of one complementary tooth being adapted for coordination with a solid area of the complementary tooth confronting the same, whereby in the coordinated functioning of the teeth the solid areas force the masticated food through the openings and into the oral cavity.

16. An artificial tooth as in claim 15, wherein the cutting means is the sharp edge of the masticatory surface opening.

17. Complementary artificial teeth in confronting relationship for masticatory use, each of said teeth comprising in combination an occlusal surface having flat crushing areas and at least one sharp edged opening, and respective canals which provide a sluiceway extending from each said opening through the body of the tooth into the oral cavity, the confronting occlusal surfaces of the respective complementary teeth having a solid area of one tooth occluding with an opening of a canal of the confronting tooth.

JACOB A. SAFFIR.

REFERENCES CITED

The following references are of record in the file of this patent:

UNITED STATES PATENTS

| Number | Name | Date |
|---|---|---|
| 470,332 | Friel | Mar. 8, 1892 |
| 1,822,837 | Avery et al. | Sept. 8, 1931 |
| 1,879,419 | Myerson et al. | Sept. 27, 1932 |
| 2,375,509 | Wiechert | May 8, 1945 |